United States Patent
Higuchi

(10) Patent No.: US 8,189,091 B2
(45) Date of Patent: May 29, 2012

(54) APPARATUS AND METHOD FOR ELECTRO-OPTICAL SPLIT IMAGE FOCUSING

(75) Inventor: Masayu Higuchi, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 547 days.

(21) Appl. No.: 12/350,385

(22) Filed: Jan. 8, 2009

(65) Prior Publication Data

US 2010/0141828 A1   Jun. 10, 2010

(30) Foreign Application Priority Data

Dec. 8, 2008 (KR) .......................... 10-2008-0124305

(51) Int. Cl.
*G03B 13/00* (2006.01)
(52) U.S. Cl. ........................ 348/349; 396/112
(58) Field of Classification Search .................. 348/348, 348/349; 359/319; 396/112
See application file for complete search history.

(56) References Cited

U.S. PATENT DOCUMENTS

| | | | | |
|---|---|---|---|---|
| 4,223,988 A | * | 9/1980 | Jyojiki et al. ................. | 396/112 |
| 4,384,762 A | * | 5/1983 | Fujibayashi et al. .......... | 396/150 |
| 6,768,867 B2 | * | 7/2004 | Kindaichi et al. ............ | 396/100 |
| 2005/0191047 A1 | | 9/2005 | Toji | |

FOREIGN PATENT DOCUMENTS

| | | |
|---|---|---|
| JP | 2004-040740 A | 2/2004 |
| JP | 2005-164983 A | 6/2005 |
| JP | 2006-154506 A | 6/2006 |
| JP | 2006154506 A * | 6/2006 |

OTHER PUBLICATIONS

Office Action established for JP 2007-257472 (Jul. 5, 2011).
Office Action established for JP 2007-257472 (Feb. 28, 2012).

* cited by examiner

*Primary Examiner* — Clayton E Laballe
*Assistant Examiner* — Noam Reisner
(74) *Attorney, Agent, or Firm* — Drinker Biddle & Reath LLP

(57) ABSTRACT

Provided are an electro-optical split image focusing apparatus and method through which an in-focus position of a photographed plane with respect to the image of a subject can be detected with accuracy and speed. The apparatus comprises at least one electro-optical element disposed along an optical axis between a subject and a photographed plane. The electro-optical element is characterized by a refractive index that varies with distance along a perpendicular to the optical axis when a voltage is applied. An image of the subject is transmitted toward the photographed plane through the electro-optical element.

18 Claims, 12 Drawing Sheets

FIG. 5
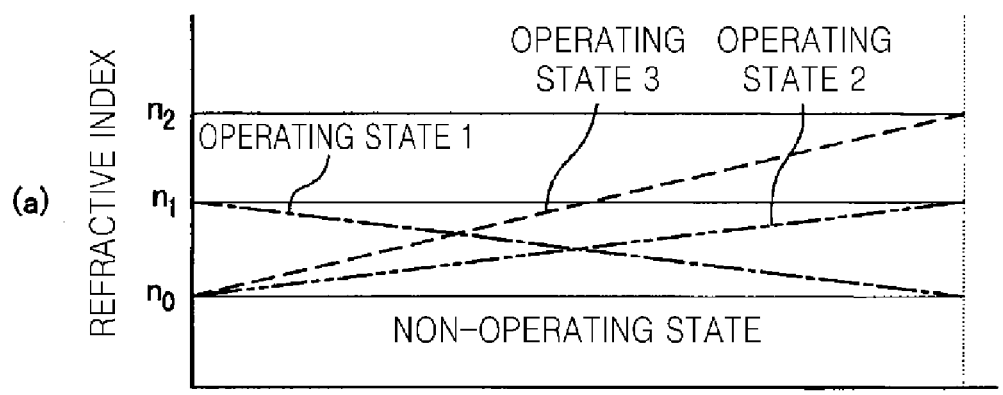
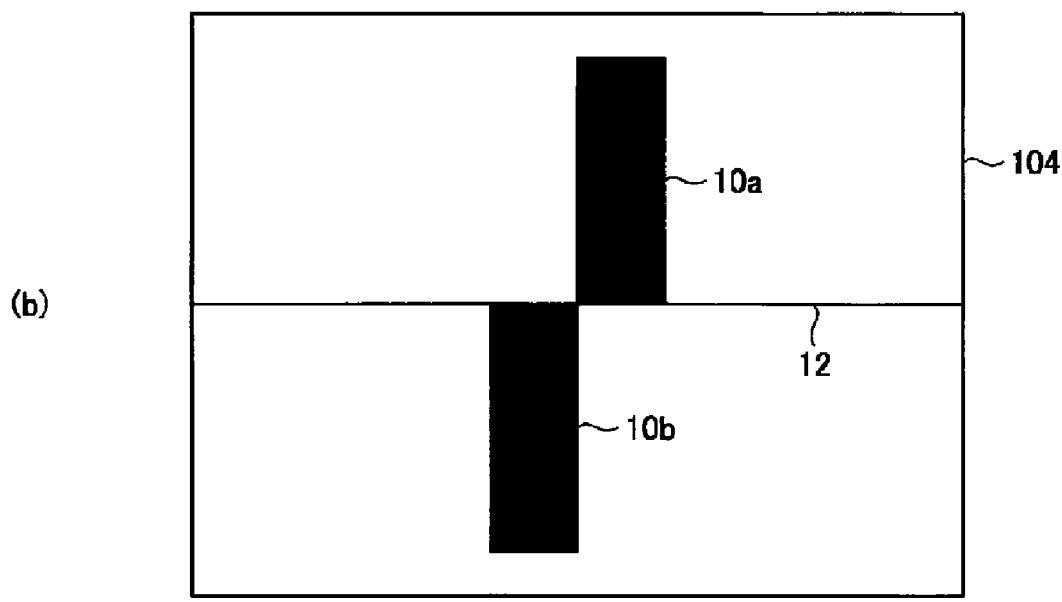
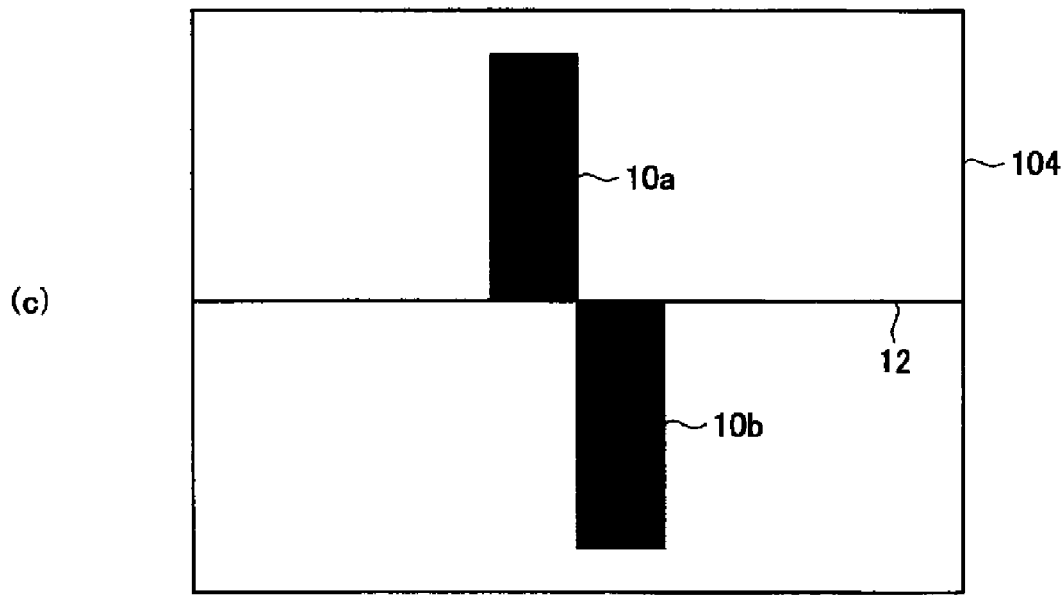

APPARATUS AND METHOD FOR ELECTRO-OPTICAL SPLIT IMAGE FOCUSING

CROSS-REFERENCE TO RELATED PATENT APPLICATIONS

This application claims the benefit of Korean Patent Application No. 10-2008-0124305, filed on Dec. 8, 2008, in the Korean Intellectual Property Office, the disclosure of which incorporated herein in its entirety by reference.

BACKGROUND OF THE INVENTION

1. Field of the Invention

The present invention relates generally to the field of photography. More specifically, the invention relates to an apparatus and method for electro-optical split image focusing.

2. Description of the Related Art

Conventional methods for finding a focal position of a photographing apparatus, such as a single-lens reflex (SLR) camera or a compact camera, include auto-focus methods whereby a photographing apparatus detects a focal position automatically by driving a focusing lens, and manual focus methods whereby a user drives a focusing lens manually while inspecting a view finder or a screen.

In manual focusing methods, a subject image is enlarged and displayed as a live view on a screen so that a focal position of the photographic apparatus can be inspected by the user. Auto-focus methods generally rely upon other techniques, such as a phase difference detection method or a contrast detection method (also known as video auto-focusing).

The phase difference detection method is generally used in an SLR camera. In the phase difference detection method, a prism is disposed in a portion of a photographing device on which light is incident. The prism splits the image from the subject, so that an amount of deviation in the image plane may be detected, and the position of the focusing lens adjusted to minimize the amount of deviation. Other methods are known for generating a split image. For example, a split image may be generated by disposing a liquid crystal diffraction grating in a portion of a photographing device on which light is incident.

The contrast detection method is generally used in a compact camera. In the contrast detection method, as a focusing lens is moved, image information is obtained. The position of the focusing lens is determined by moving the focusing lens to a position in which contrast is highest (i.e., a position in which the largest amount of edges is detected).

Conventional methods suffer from several different problems. For example, when the photographing device is supported by hands, especially when the view finder or screen is not enlarged, unsteady hands can make it difficult to see a view finder or screen, and thereby determine a focal position manually. In addition, even when a focusing lens is manipulated based on an enlarged display, it is difficult to check deviation of a focal position with naked eyes. These problems also make focusing difficult to perform fast.

Conventional auto-focus methods also suffer from problems. For example, when the contrast detection method is used for auto-focusing, the focusing lens is driven in a progressive scan, and detection of the focal position in the middle of scanning is not required. Thus, it can take more time to determine focal position using the contrast detection method. In addition, in the compact camera, there is typically no space for placing a prism in an optical path, making it difficult to use the phase difference detection method in the compact camera.

To save space, a liquid crystal diffraction grating has also been used with the phase difference detection method. However, the response speed of liquid crystals is typically slow, and a time lag may prevent proper focus from being achieved during photography. In addition, liquid crystal diffraction gratings are not well-adapted for use with split image focusing. Typically, liquid crystal diffraction gratings have alternately disposed layers of high density liquid crystal particles and low density liquid crystal particles. When such a layered liquid crystal diffraction grating is fixed at a predetermined angle, the refractive index is approximately uniform. Thus, when an aperture of a lens is greater than a predetermined diameter (which is a function of the refractive index of the diffraction grating), edges of the image are cut-off, and split image focusing becomes impossible.

SUMMARY OF THE INVENTION

The present invention provides an apparatus and method for eletro-optical split image focusing whereby the in-focus position of a photographed plane of a subject image can be determined with accuracy and speed.

According to an aspect of the present invention, there is provided a split image focusing apparatus, comprising at least one electro-optical element disposed along an optical axis between a subject and a photographed plane. In an embodiment, two electro-optical elements are disposed in a plane perpendicular to the optical axis and perpendicular to each other. The electro-optical element or elements are characterized by a refractive index that varies with distance along a perpendicular to the optical axis when a voltage is applied, and through which an image of the subject is transmitted toward the photographed plane.

The split image focusing apparatus of the present invention may also include a voltage value controller, a photographing device, an image-plane deviation position detector, a focusing lens with focusing lens driving controller, and a driving position calculator.

The voltage value controller can be used to change the magnitude of the voltage applied to one or more electro-optical elements in response to a change in an aperture ratio. Alternatively or in addition, the voltage value controller can be used to reverse the polarity of the voltage applied to one or more electro-optical elements. The photographing device disposed on the photographed plane may be a charge-coupled device (CCD) or complementary metal-oxide semiconductor (CMOS). The image-plane deviation position detector calculates a deviation in the position of a focusing lens and generates a signal that is supplied to the focusing lens driving controller, which in turn is supplied to the driving position calculator.

According to another aspect of the present invention, the split image focusing apparatus comprises in addition to a photographing device an image processor that synthesizes a first image that is generated due to the subject image on the photographed plane when a voltage is not applied to the image processor and a second image that is generated due to the subject image on the photographed image when a voltage is applied to the image processor. The present invention may further include an image display controller for displaying the image that is synthesized by the image processor on an image display unit. In accordance with this aspect of the invention, a predetermined correction operation may be performed on the image formed on the photographed plane from light transmitted through the at least one electro-optical element.

The present invention also provides a method for split image focus photography. The method includes steps of refracting light along a perpendicular to the optical axis between a subject and a photographed plane using an electro-optical element disposed between them. The refraction is achieved by a variation in refractive index achieved by applying a voltage to opposed ends of the electro-optical element. The method also includes steps of converting light transmitted through the into an electrical signal by using photoelectrical conversion, detecting an image-plane-deviation position of the subject image on the photographed plane that is generated by refraction in the optical element, based on the electrical signal, and controlling driving of a focusing lens that moves in a direction of an optical axis and focuses the subject image on the photographed plane.

Another part of the method of the present invention involves changing the voltage applied to the at least one electro-optical element in response to a change in an aperture rati, or changing a polarity of the voltage applied to the electro-optical element based on a relationship between how a focusing lens moves along the optical axis and a direction of a manual operation of moving the focusing lens.

Yet another part of the method of the present invention relates to processing and synthesizing a first image that is generated due to the image of the subject on the photographed plane when a voltage is not applied to the image processor and a second image that is generated due to the image of the subject on the photographed image when a voltage is applied to the image processor.

BRIEF DESCRIPTION OF THE DRAWINGS

The above and other aspects of the present invention will become more apparent by describing in detail exemplary embodiments thereof with reference to the attached drawings in which:

FIG. 5 is a graph showing distribution of refractive indices and is a front view of a plane photographed by the CCD;

DETAILED DESCRIPTION OF THE INVENTION

Figure 1:
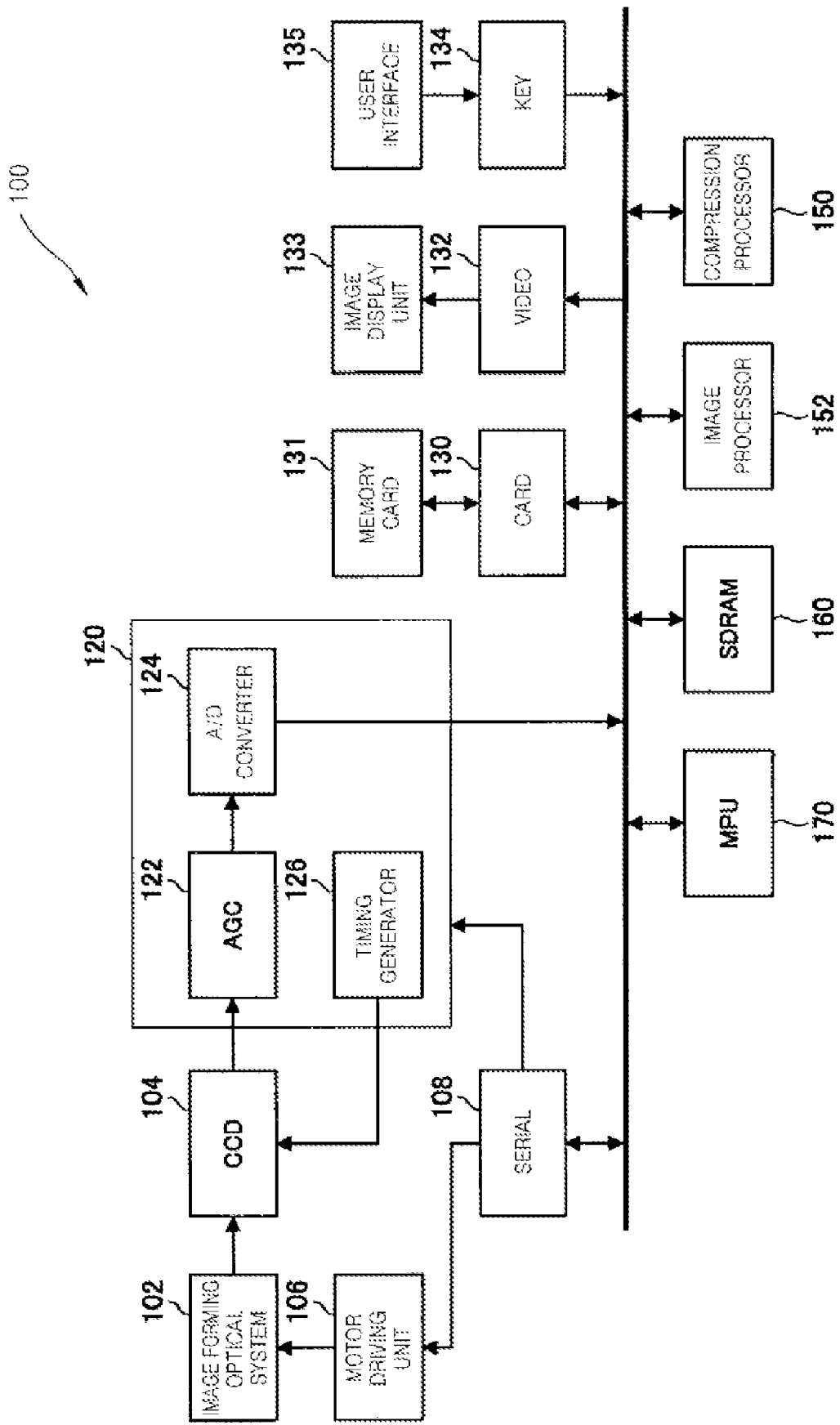
FIG. 1 is a block diagram of a photographing apparatus according to an embodiment of the present invention.

The present invention will now be described in detail by explaining exemplary embodiments of the invention with reference to the attached drawings. Like reference numerals in the drawings denote like elements, and thus their description will be omitted.

First, a structure of a photographing apparatus according to an embodiment of the present invention will be described. FIG. 1 is a block diagram of a photographing apparatus 100 according to an embodiment of the present invention. The photographing apparatus 100 according to the current embodiment includes an image forming optical system 102, a charge coupled device (CCD) 104, a motor driving unit 106, a serial interface (I/F) unit 108, an analog front end (AFE) unit 120, a card I/F unit 130, a memory card 131, a video I/F unit 132, an image display unit 133, a key I/F unit 134, a user interface 135, a compression processor 150, an image processor 152, a synchronous dynamic random access memory (SDRAM) 160, and a micro processor unit (MPU) 170.

The photographing apparatus 100 includes the image forming optical system 102 disposed in front of the CCD 104. The image forming optical system 102 is an optical system, which images external light information on the CCD 104. In some embodiments, the image forming optical system 102 includes a lens (not shown), a zoom unit (not shown), and a focusing unit (not shown). In such embodiments, the focusing unit further includes a focusing lens (not shown), a diaphragm unit (not shown), and a tube-shaped mirror unit (not shown) in which a lens is installed. The diaphragm unit may be used to limit the direction or amount of light flux by changing the size of an aperture.

The CCD 104 includes optoelectronic elements that convert light incident through the image forming optical system 102 into an electrical signal, and each of the elements generates an electrical signal caused by light received. In the embodiment shown, the CCD 104 is used as a photographing device. However, the present invention is not limited thereto, and for example, a complementary metal oxide semiconductor (CMOS) may be used as the photographing device.

In addition, a mechanical shutter (not shown) may be used so as to control an exposure time of the CCD 104. The mechanical shutter is used to intercept light during a non-photographing operation and allows light only during a photographing operation. In addition, the present invention is not limited thereto, and an electronic shutter (not shown) may be used. An operation of the mechanical shutter or the electronic shutter can be performed using a shutter button, which can be a part of the user interface 135.

In the embodiment shown, the motor driving unit 106 drives the zoom unit, the focusing unit, and the diaphragm unit of the image forming optical system 102. An operational signal is input to the motor driving unit 106 from the MPU 170 or the like via the serial I/F unit 108.

The analog front end (AFE) unit 120 includes an automatic gain control (AGC) 122, an analog to digital (A/D) converter 124, and a timing generator 126. An operational signal is input to the AFE unit 120 from the MPU 170 via the serial I/F unit 108. The AGC 122 removes low frequency noise included in the electrical signal output by the CCD 104 by using a correlated double sampling circuit or an amplifier. The AGC 122 can also be configured to amplify the electrical signal to a predetermined level.

The A/D converter 124 converts the analog electrical signal output by the AGC 122 into a digital signal. The A/D converter 124 outputs the converted digital signal to the image processor 152.

The timing generator 126 inputs a timing signal to the CCD 104 or the AGC 122 to control an exposure period of each of pixels that constitute the CCD 104 or reading of charges. In addition, the timing generator 126 includes a synchronous signal generator and allows the photographing apparatus 100 to operate in response to a synchronous signal generated by the synchronous signal generator.

The card I/F unit 130 controls writing of image data in the memory card 131 or reading of the image data recorded in the memory card 131. The memory card 131 is a semiconductor memory medium and records photographed image data. One of skill in the art will appreciate, however, that other memory media, such as optical recording media (CD or DVD), magneto-optical media, or magnetic media (such as a hard drive), may be used as the memory card 131. The card I/F unit 130 and the memory card 131 may be attached to or detached from the photographing apparatus 100.

The image display unit 133 is driven by the video I/F unit 132, and an output thereof is controlled. The image display unit 133 includes a display unit, such as a liquid crystal display (LCD). The image display unit 133 displays a live view before an image read by a video random access memory (VRAM) (not shown) is photographed. Alternatively, the image display unit 133 displays various kinds of set screens of the photographing apparatus 100, or an image that has previously been photographed and recorded. The image display unit 133 displays an image that is synthesized by the image processor 152. The VRAM is a memory for displaying an image and includes a memory having several channels so as to simultaneously write the displayed image or display the image on the image display unit 133. The VRAM is used to display a live view of the image display unit 133 during a recording operation or to temporarily memorize an image signal displayed on the image display unit 133 during a reproduction operation.

The user interface 135 is used to perform various setting operations or manipulation on the photographing apparatus 100, and manipulation of the user interface 135 is output as a signal to the MPU 170 via the key I/F unit 134.

The compression processor 150 converts input image data containing a digital signal into data that is compressed in a compression format such as JPEG. The image processor 152 processes the digital signal output by the A/D converter 124 or an image on the SDRAM 160 to output the processed image to the SDRAM 160.

The SDRAM 160 is an example of a semiconductor memory device, and the photographed image is temporarily stored in the SDRAM 160. In addition, an operational program of the MPU 170 is stored in the SDRAM 160.

The MPU 170 functions as an operation processor using a program and a controller, and may control processing of each of elements installed in the photographing apparatus 100. The MPU 170 outputs a signal to the motor driving unit 106 based on focusing control or exposure control, and drives the image forming optical system 102. In addition, the MPU 170 controls each of the elements of the photographing apparatus 100 based on a signal output by the manipulation unit. In the current embodiment, only one MPU 170 is installed. However, the MPU 170 may include a plurality of central processing units (CPUs), which execute commands from a signal system and commands from a manipulation system.

The MPU 170 includes functional blocks such as an image-plane-deviation detector, a driving-position calculator, a voltage-polarity controller, an aperture-ratio obtaining unit, and a voltage-value controller.

Figure 2:
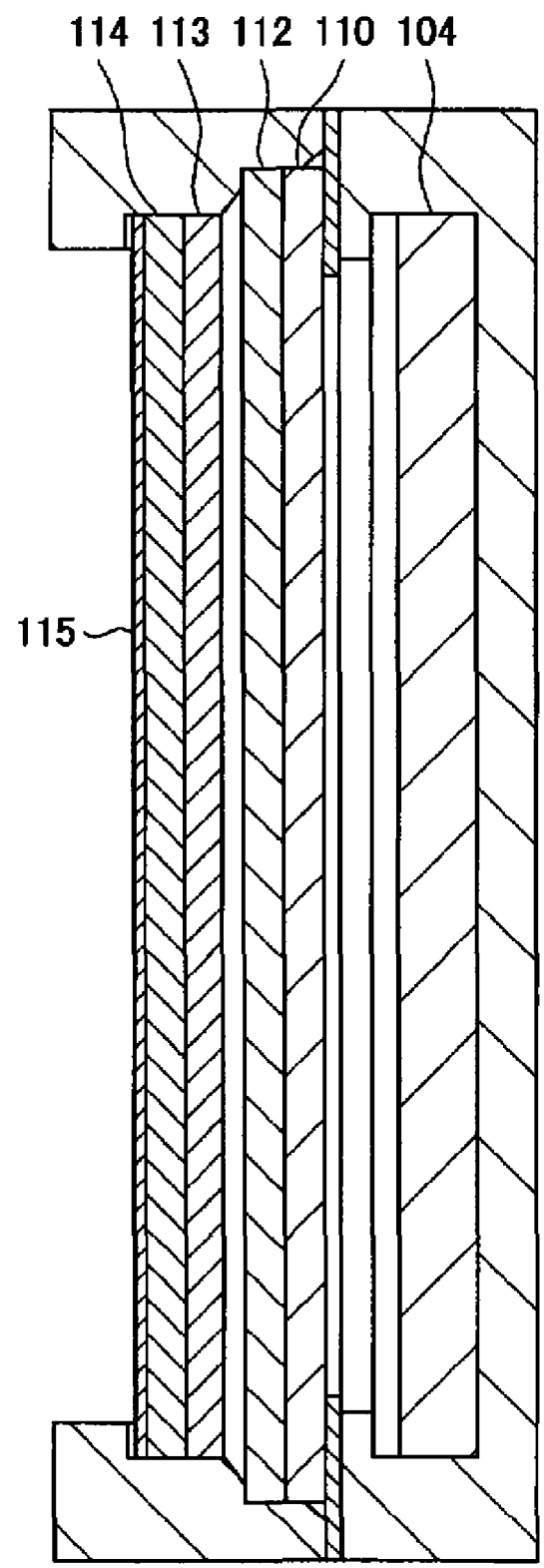
FIG. 2 is a cross-sectional view of an optical element and a charge coupled device (CCD) of the photographing apparatus illustrated in FIG. 1, according to an embodiment of the present invention.
Figure 3:
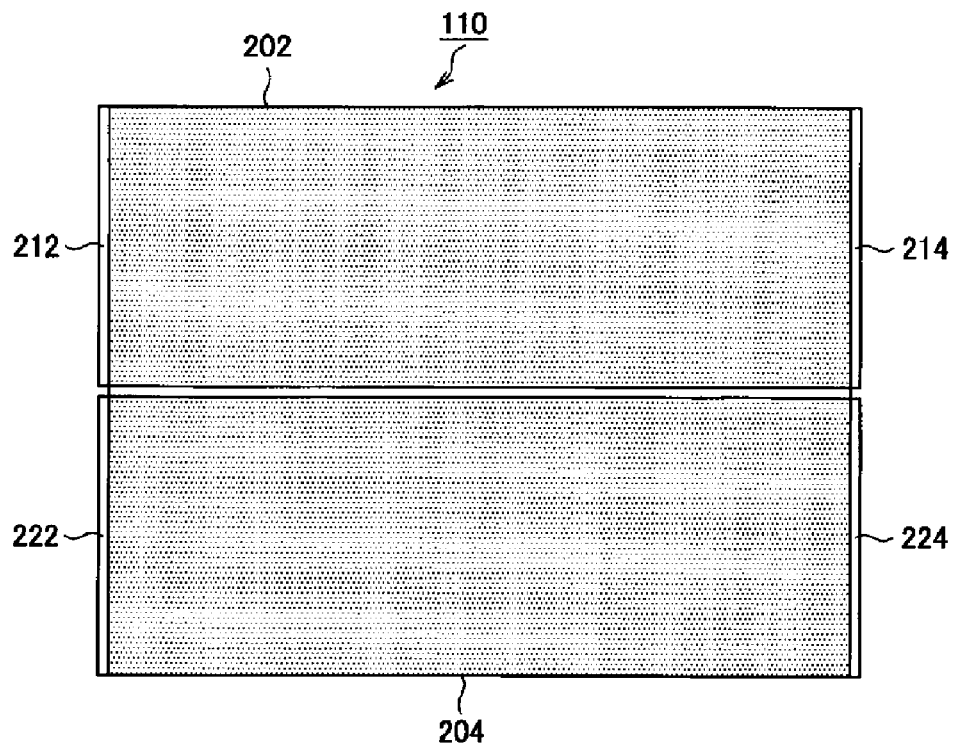
FIG. 3 is a front view of a split image sheet of the photographing apparatus of FIG. 1, according to an embodiment of the present invention.
Figure 4:
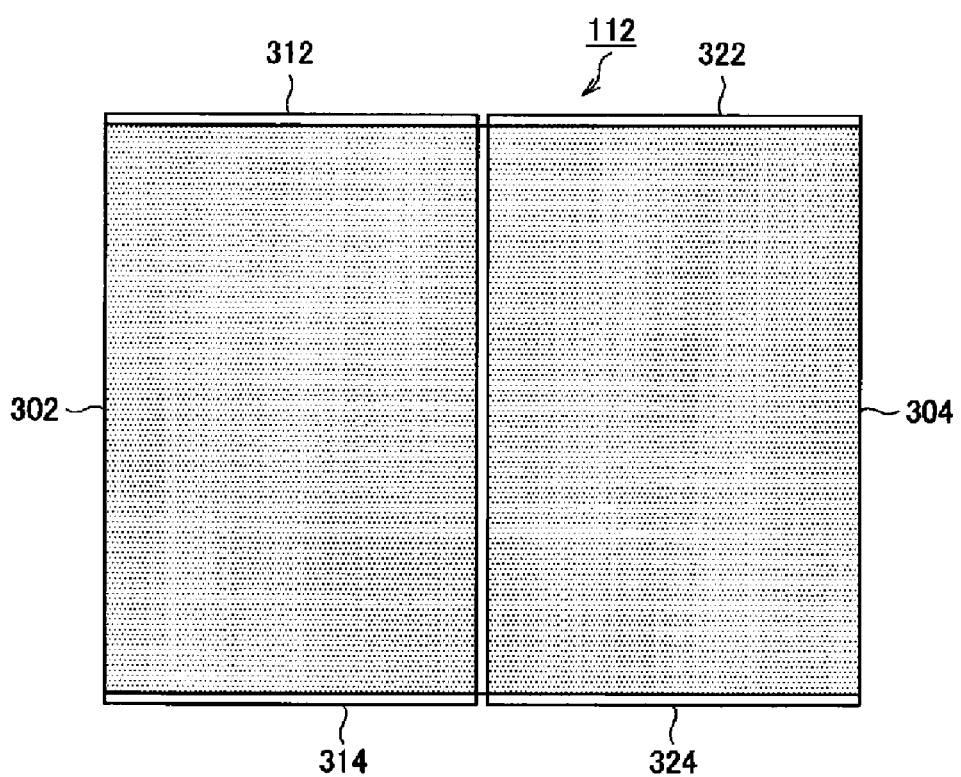
FIG. 4 is a front view of a split image sheet of the photographing apparatus of FIG. 1, according to another embodiment of the present invention.

Each of the optical elements that are installed between the subject and the CCD 104 will now be described with reference to FIGS. 2 through 4. FIG. 2 is a cross-sectional view of each of the optical elements and the CCD 104 according to an embodiment of the present invention. FIG. 3 is a front view of a split image sheet 110 according to an embodiment of the present invention. FIG. 4 is a front view of a split image sheet 112 according to another embodiment of the present invention.

The optical elements installed between the subject and the CCD 104 include split image sheets 110 and 112, optical low pass filters (LPF) 113 and 114, and an infrared ray reflective film 115, as illustrated in FIG. 2. In order from closest to furthest form the CCD 104, the optical elements are placed in the order of split image sheet 110, split image sheet 112, optical LPF 113, optical LPF 114, and infrared ray reflective film 115. As one of skill in the art will recognize, other optical elements (such as a phase sheet) may be used both in addition or in place of those elements shown in FIG. 2. Moreover, the optical elements may be placed in a different order without affecting the function of the entire assembly.

The optical LPFs 113 and 114 are made from a single crystalline substrate, which polarizes a subject image along the horizontal or vertical direction. The optical LPFs 113 and 114 may prevent deviated color or moire by excluding a high spatial frequency component of the image of the subject. In the embodiment shown, the optical LPF 113 polarizes the subject image in the horizontal direction, and the optical LPF 114 polarizes the subject image in the vertical direction. The infrared ray reflective film 115 may suppress an after-image due to infrared rays or light fading by reflecting infrared rays.

The split image sheets 110 and 112 are constituted by disposing two of a plurality of electro-optical members 202, 204 and 302, 304 on the same plane. The width of each of the split image sheets 110 and 112 illustrated in FIGS. 3 and 4 is enough to cover the entire surface of a plane photographed by the CCD 104.

The split image sheet 110 includes the electro-optical members 202 and 204, which are longest in a widthwise direction of the CCD 104, and a plurality of electrodes 212, 214, 222, and 224 disposed on both ends of the electro-optical members 202 and 204. The split image sheet 112 includes the electro-optical members 302 and 304, which are longest in a lengthwise direction of the CCD 104, and a plurality of electrodes 312, 314, 322, and 324 disposed on both ends of the electro-optical members 302 and 304.

An operation of the split image sheets 110 and 112 will now be described with reference to FIG. 5. FIG. 5 is a graph showing how refractive index varies with the distance between oppositely disposed electrodes in various operating states.

When a voltage is not applied to each of the electro-optical members 202, 204, 302, and 304, each of the electro-optical members 202, 204, 302, and 304 has uniform refractive index from one electrode to another electrode, as in a non-operating state shown in (a) of FIG. 5. In addition, when a voltage is applied to each of the electrodes 212, 214, 222, and 224 disposed on both ends of the electro-optical members 202 and 204 and each of the electrodes 312, 314, 322, and 324 disposed on both ends of the electro-optical members 302 and 304, a refractive index of each of the electro-optical members 202, 204, 302, and 304 increases or decreases gradually from one end to the other end, i.e., from one electrode to another electrode of an incident side of each of the electro-optical members 202, 204, 302, and 304 due to the applied voltage.

As shown in part (a) of FIG. 5, in an operating state the refractive index of each of the electro-optical members 202, 204, 302, and 304 varies linearly from an electrode having a refractive index of 1 to the oppositely disposed electrode, as in an operating state 1 shown in part (a) of FIG. 5. In addition, a voltage having the same magnitude but opposite polarity to the operating state 1 is applied to each of the electro-optical members 202, 204, 302, and 304, each of the electro-optical members 202, 204, 302, and 304 has refractive index distribution having opposite inclination to an operating state 1, as illustrated by operating state 2 shown in part (a) of FIG. 5.

Moreover, as illustrated by operating state 3 in part (a) of FIG. 5, when the voltage applied in the operating state 2 is increased, the refractive index distribution changes. Each of the electro-optical members 202, 204, 302, and 304 then has a refractive index distribution with greater linear slope than in the operating state 2. In an embodiment, changes in operating state are performed by the voltage polarity controller disposed at the MPU 170.

Let the subject of a photographic image be a black rectangular bar, which is longest in the vertical direction. When an image of the subject is not in focus, the image of the subject will form on a plane that is either in front of or behind the plane photographed by the CCD 104. Thus, when voltages of opposite polarity are applied to the two electro-optical members 202 and 204 disposed up and down and the image is not in focus, the image formed on the plane photographed by the CCD 104 will be similar in form to those illustrated in (b) or (c) of FIG. 5. Hereinafter, an image in which the focal plane deviates from the photographed plane is referred to as a split image. In addition, when voltages of opposite polarity are applied to the two electro-optical members 302 and 304 disposed right and left, a split image may be formed on the photographed plane. When a split image is not formed on the photographed plane, the focusing lens is in an in-focus position, and the subject can be photographed.

More specifically, if the electro-optical member 202 is in the operating state 1 shown in part (a) of FIG. 5 and the electro-optical member 204 is in the operating state 2 shown in part (a) of FIG. 5, and a split image like the one shown in part (b) of FIG. 5 is obtained, then the focusing lens is positioned too far away from the CCD 104 for the focal plane to form on the CCD 104. On the other hand, if the electro-optical members 202 and 204 are in the same operating states (1 and 2, respectively) and a split image like the one shown in part (c) of FIG. 5 is obtained, then the focusing lens is positioned too close to the CCD 104 for the focal plane to form on the CCD 104.

Similarly, if the electro-optical member 202 is in the operating state 2 shown in part (a) of FIG. 5 and the electro-optical member 204 is in the operating state 1 shown in part (a) of FIG. 5, and the split image shown in (b) of FIG. 5 is obtained, then the focusing lens is positioned too close to the CCD 104 for the focal plane to fall on the CCD 104. And if the electro-optical members 202 and 204 are in the same operating states (now 2 and 1, respectively) and the split image shown in part (c) of FIG. 5 is obtained, then the focusing lens is positioned too far away from the CCD 104 for the focal plane to form on the CCD 104.

In the case of manual focusing, when the focusing lens is driven in a direction of infinity (∞) by manually rotating the focusing ring of a lens clockwise, the voltage polarity controller applies a voltage to each of the electro-optical members 202 and 204 so that the electro-optical member 202 is in the operating state 1 and the electro-optical member 204 is in the operating state 2. Thus, when a split image like the one shown in part (b) of FIG. 5 is obtained, the focusing ring of the lens must be rotated counterclockwise so as to move the focusing lens a short distance toward the CCD 104. In response, the split image 10a shown in part (b) of FIG. 5 moves to the left, and the split image 10b shown in part (b) of FIG. 5 moves to the right.

Similarly, if the focusing lens is driven in a direction toward the CCD 104 by manually rotating the focusing ring of the lens clockwise, and the voltage polarity controller applies a voltage to each of the electro-optical members 202 and 204 so that the electro-optical member 202 is in the operating state 2 and the electro-optical member 204 is in the operating state 1, and a split image like the one shown in part (b) of FIG. 5 is obtained, then the focusing ring of the lens must be rotated counterclockwise (thereby driving the focusing lens in the direction of infinity (∞)) so that the split image 10a shown in part (b) of FIG. 5 is moved to the left, and the split image 10b shown in part (b) of FIG. 5 is moved to the right.

One of skill in the art will note that this implies that when the polarity of the voltages applied to the electro-optical members 202 and 204 is reversed, the relationship between the direction of movement of the focusing lens and the direction of movement of the split images is also reversed. The ability to focus manually by feel can be easily performed in any of these configurations of polarity or direction of movement. As an alternative, the photographing apparatus 100 may obtain information (from the lens of the image forming optical system 102 or from a setting of the user interface 135) that indicates the relationship between the rotation direction of the focusing ring and the direction of movement of the focusing lens. As explained above, the voltage polarity controller can reverse the refractive index distribution of the electro-optical members 202 and 204 by reversing the polarity of the applied voltage based on the obtained information.

A value of the applied voltage is controlled by the voltage value controller (not shown) disposed at the MPU 170, for example. Whatever refractive index distribution that occurs in the split image sheets 110 and 112 may be controlled by the voltage value controller. For example, the voltage value controller may change the refractive index distribution from the operating state 2 to the operating state 3 shown in part (a) of FIG. 5.

Figure 6:
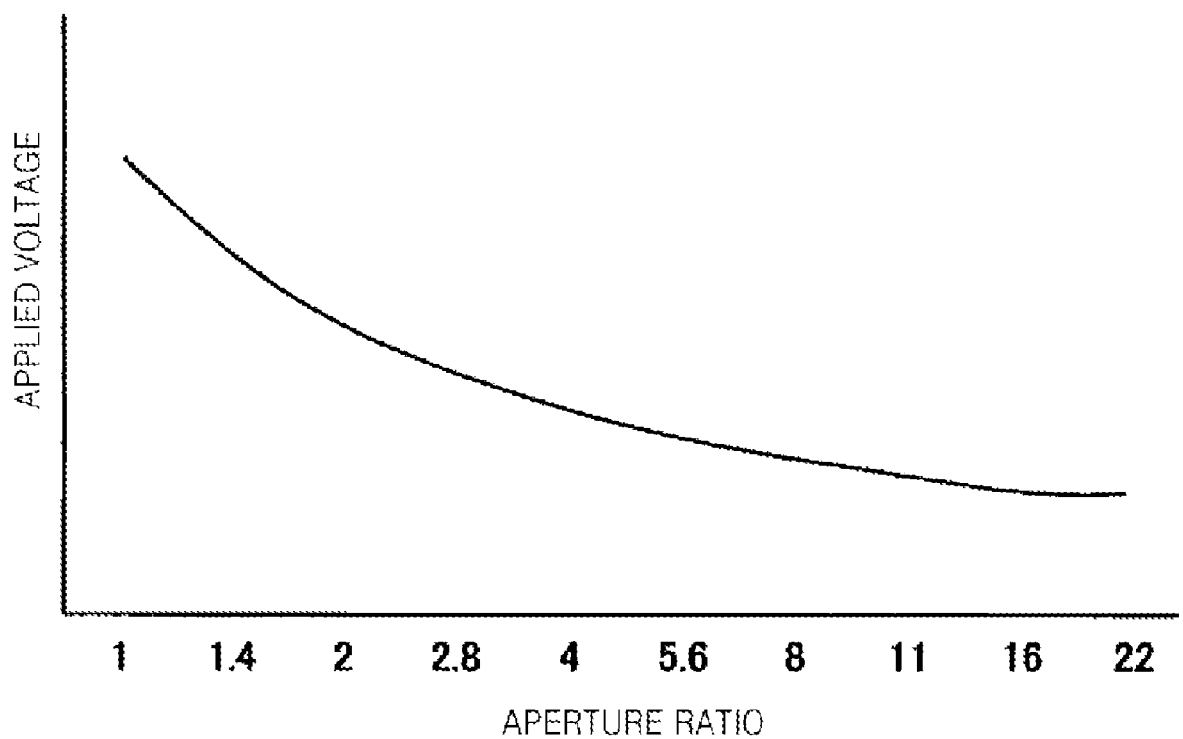
FIG. 6 is a graph showing a voltage applied to the split image sheet of the photographing apparatus of FIG. 1 versus an aperture ratio.

Because the split image formed by propagation of light through the split image sheets 110 and 112 relies upon rays disposed toward the periphery of the lens (i.e., away from the optical axis), as the lens aperture decreases with the refractive index distribution of the split image sheets 110 and 112 held constant, rays toward the periphery of the lens may be blocked, preventing the formation of a split image. Thus, the voltage value controller also adjusts the maximum voltage applied to the split image sheets 110 and 112 in response to changes in aperture size. FIG. 6 is a graph showing how a voltage applied to the split image sheets 110 and 112 of the photographing apparatus of FIG. 1 varies with an aperture ratio (i.e., the ratio of the diameter of the aperture to the focal length). As the aperture ratio increases, the applied voltage decreases. As a result, when the aperture ratio increases, the maximum refractive index of each of the split image sheets 110 and 112 decreases, alleviating the problem with edges of the split image being blocked. The voltage value controller varies in response to an aperture ratio obtained by an aperture ratio unit, which is disposed at the MPU 170.

Figure 7:
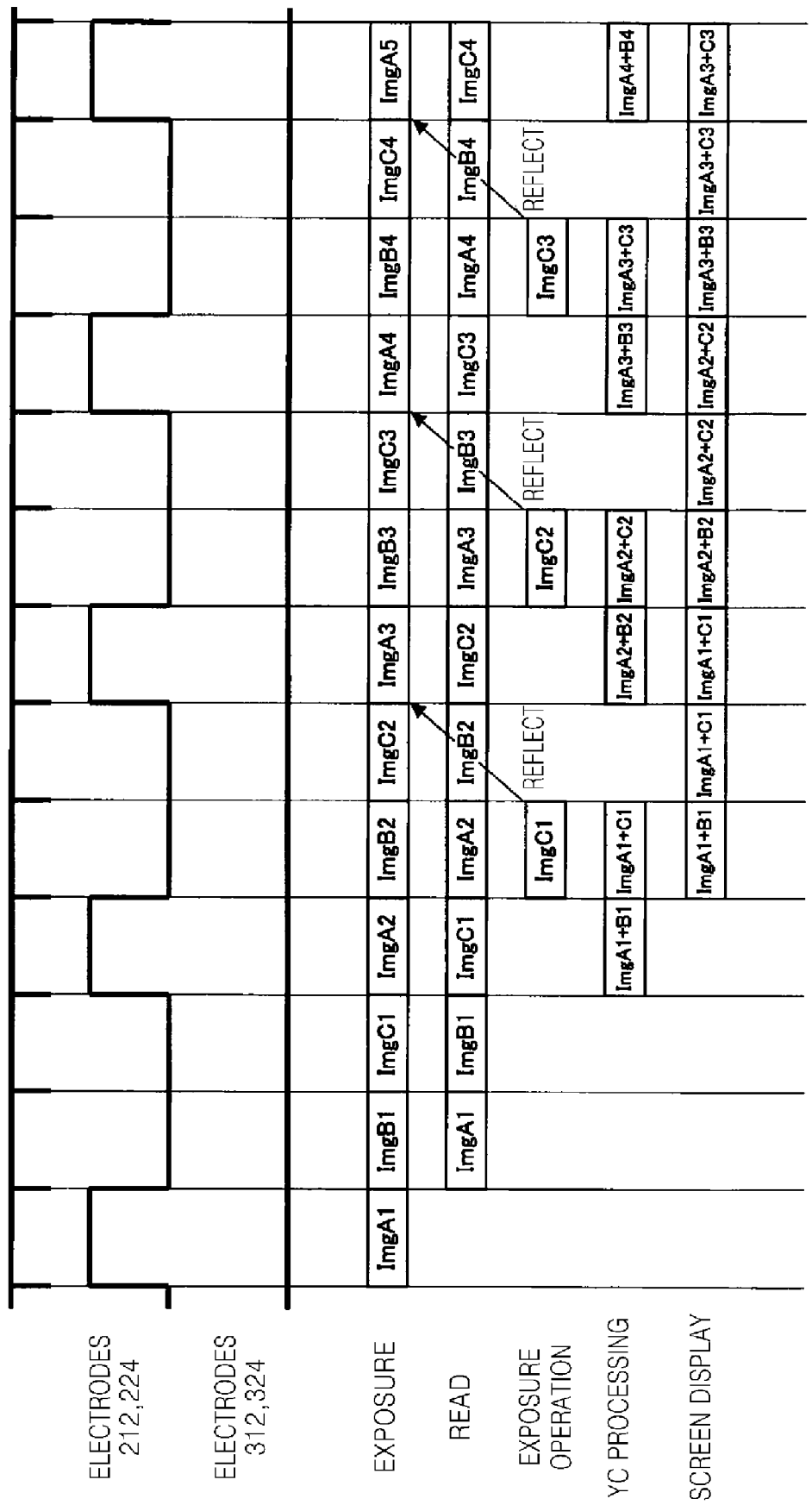
FIG. 7 is a timing chart illustrating a focusing operation to be performed in a manual focusing (MF) mode, according to an embodiment of the present invention.
Figure 8:
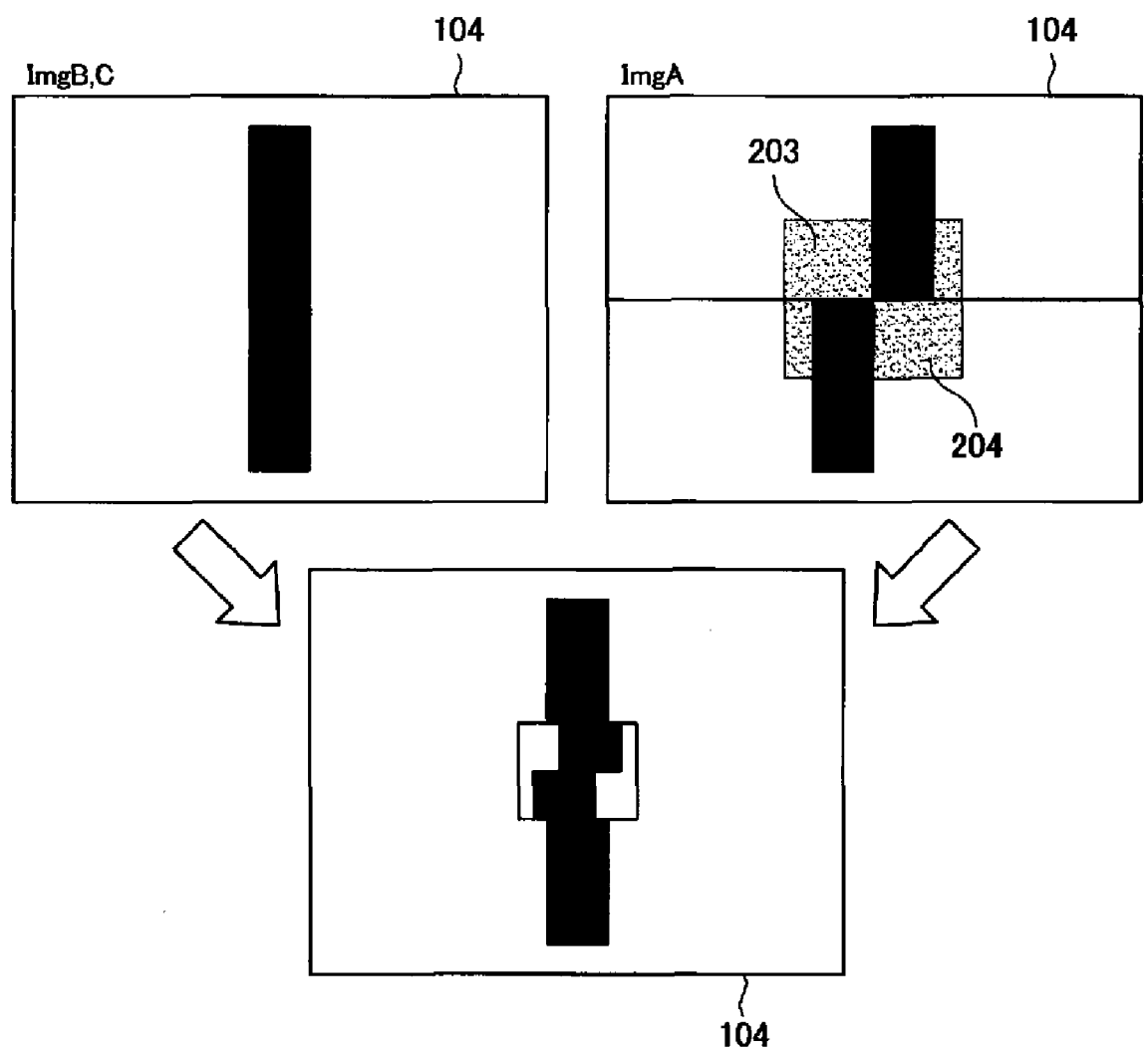
FIG. 8 illustrates a synthesizing operation to be performed when an image is displayed in the MF mode, according to an embodiment of the present invention.

An example of a sequence of operations carried out in accordance with the apparatus and method of the present invention will now be described. First a focusing operation performed in manual focusing (MF) mode will be described with reference to FIGS. 7 and 8. FIG. 7 is a timing chart illustrating a focusing operation performed in the MF mode, according to an embodiment of the present invention. FIG. 8 illustrates a synthesizing operation performed when an image is displayed in the MF mode, according to an embodiment of the present invention. A description of a focusing operation performed in auto-focusing mode (AF) follows with reference to FIGS. 10 and 11.

A vertical synchronous signal VD is output by the timing generator 126, and each operation that will be described later is performed in synchronization with the vertical synchronous signal VD. In the MF mode, voltages are not applied to the electrodes 312, 314, 322, and 324 of the split image sheet 112, and a focal point is detected by using only the split image sheet 110. The split image sheet 112 is a transparent sheet having no refractive index, and a subject image is transmitted through the split image sheet 112. The split image sheet 110 is disposed to be closer to the CCD 104 than the split image sheet 112 so that the deviation in position of the split image can be corrected or deviation of the focal plane can be prevented.

Referring now to FIG. 7, in a first frame, a voltage is applied to each of the electrodes 212 and 224 that are disposed at one end of the split image sheet 110. In this case, the electrodes 214 and 222 that are disposed at the other end of the split image sheet 10 are set to ground. When the voltage is applied to each of the electrodes 212 and 224 of the split image sheet 110, if the subject image is not in focus, then the split image shown as ImgA of FIG. 8 is exposed to the CCD 104, and is labeled ImgA1 in FIG. 7.

In the next frame, a voltage is not applied to each of the electrodes 212 and 224 of the split image sheet 110. Thus, the split image sheet 110 is a transparent sheet having no refractive index, and the subject image is transmitted to the CCD 104 through the split image sheet 110. In this frame, the image of the subject (shown as ImgB of FIG. 8) is exposed to the CCD 104, and is labeled ImgB1 in FIG. 7. In the immediately following frame, a voltage is again not applied to the electrodes 212 and 224 of the split image sheet 110, and the same image as ImgB (but now labeled ImgC in FIG. 8) is exposed to the CCD 104, and is labeled ImgC1 in FIG. 7. One of skill in the art will understand, however, that FIG. 7 is only an example of the sequence of operations, and that different timing could be used to expose the same split image.

As shown in FIG. 7, in an embodiment the exposed image of the subject ImgC1 is read in the frame immediately following its exposure. The exposed image ImgC1 is reflected before being compared to the split image ImgA3, which is captured in a later frame.

Next, the images of the subject that have not been split (i.e., ImgB1 and ImgC1) are synthesized and compared with the split image ImgA1. The synthesis is carried out within YC processing, and is schematically indicated by the plus symbols (ImgA1+ImgB1, ImgA1+ImgC1). In the synthesis operation, the portion of images in regions 203 and 204 of FIG. 8 are extracted from the split image ImgA1, and the portions that correspond to the regions 203 and 204 in the images ImgB and ImgC are overwritten. The synthesizing operation is performed on raw images.

A predetermined amount of a relative position of the image of the subject image on the photographed plane of the regions 203 and 204 may be moved by using the image processor 152, and then may be synthesized with the subject image ImgB or ImgC. In this case, the predetermined amount is an amount at which the image of the subject is corrected by deviation that is caused by a difference between a distance from the subject to a plane of the split image sheet 110 and a distance from the subject to the photographed plane of the CCD 104. Alternatively, the relative position of the image of the subject may be moved when an amount of deviation of the split image is enlarged and displayed due to user setting, for example. In addition, when the aperture ratio of the lens is large, the relative position of the image of the subject may be moved when a refractive index of each of the electro-optical members 202 and 204 is small and the amount of deviation of the split image is enlarged and displayed. In this case, movement of the image of the subject is performed based on the amount calculated so as to enlarge and display the amount of deviation of the split image.

YC processing is performed in each of the next frames after the subject image ImgB or ImgC (not the split image) is read. In addition, screen display is performed when an image generated by YC processing is displayed in the next frame. In this case, when an image to be displayed is not generated, an image in the previous frame is displayed again.

Figure 9:
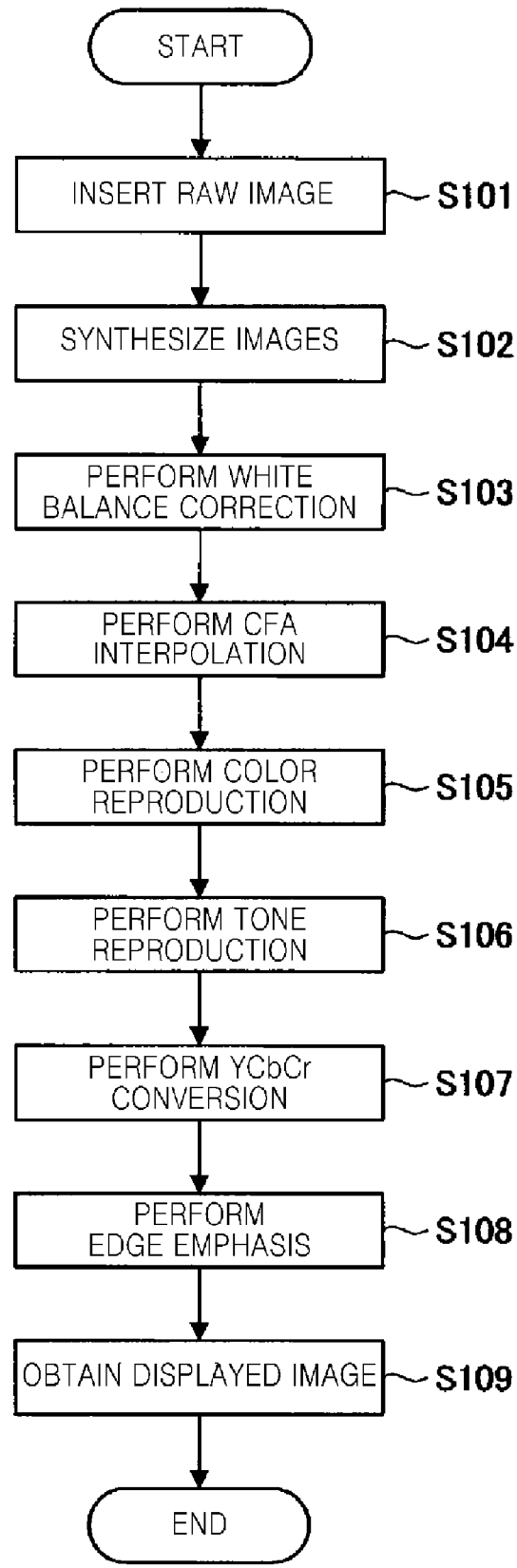
FIG. 9 is a flowchart illustrating an operation of generating an image to be displayed, by using the photographing apparatus of FIG. 1, according to an embodiment of the present invention.

Next will be described an operation of generating an image to be displayed by using the photographing apparatus 100 according to an embodiment of the present invention. FIG. 9 is a flowchart illustrating the operation of generating an image to be displayed by using the photographing apparatus of FIG. 1, according to the present embodiment of the present invention.

First, in operation S101, an analog electrical signal of an image formed on the CCD 104 is converted into a digital image signal, and the digital image signal is inserted in the image processor 152. Second, in operation S102, the image processor 152 synthesizes a first image that is generated due to a image of the subject on the CCD 104 when a voltage is not applied to the image processor 152 and a second image that is generated due to the image of the subject on the CCD 104 when a voltage is applied to the image processor 152. Alternatively, the image processor 152 may perform an image synthesizing operation of correcting a portion corresponding to a boundary of the electro-optical members 202 and 204 so as to suppress disturbance of images formed on ends of the electro-optical members 202 and 204.

In addition, the image processor 152 performs white balance correction (S103), color filter array (CFA) interpolation (S104), color reproduction (S105), and tone reproduction (S106) based on the image signal.

After the above series of image processing steps is performed, the image signal is YCbCr converted, and a brightness signal and a color difference signal are generated (S107). Following that step, an edge emphasis step is performed (S108). The generated image data is output to the image display unit 133, and the image display unit 133 displays the image (S109).

Figure 10:
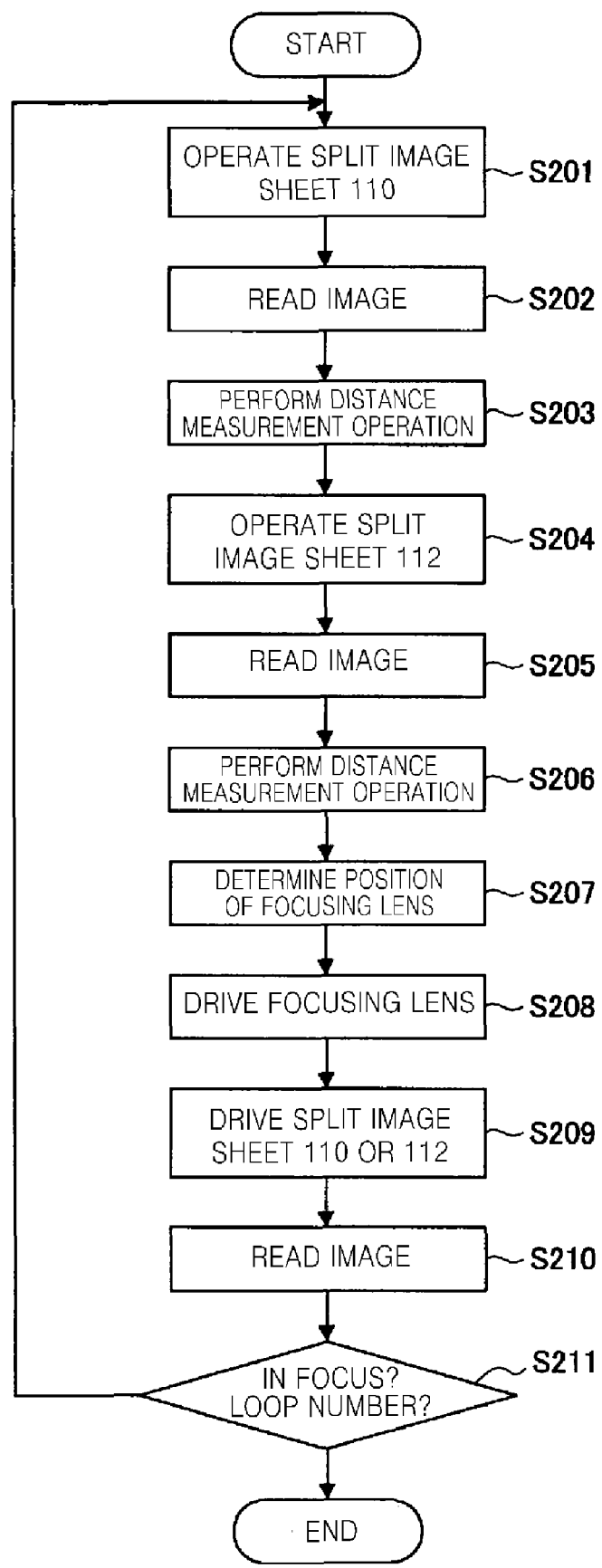
FIG. 10 is a flowchart illustrating a focusing operation to be performed in an auto-focusing (AF) mode, according to an embodiment of the present invention.
Figure 11:
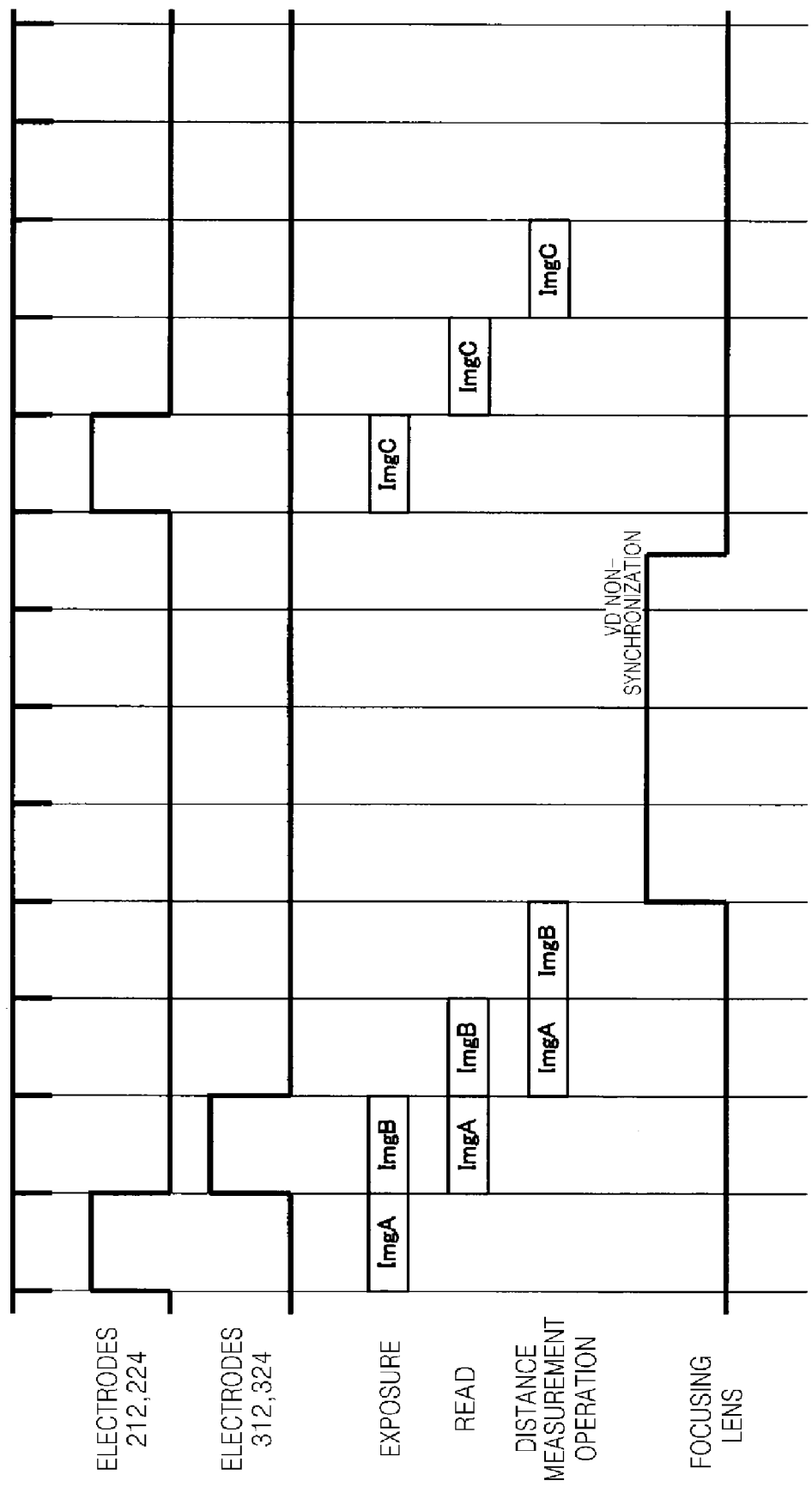
FIG. 11 is a timing chart illustrating a focusing operation to be performed in the AF mode.

The present invention also includes an auto-focus mode. Next will be described a focusing operation to be performed in an auto-focusing (AF) mode with reference to FIGS. 10 and 11. FIG. 10 is a flowchart illustrating a focusing operation to be performed in the AF mode, according to an embodiment of the present invention. FIG. 11 is a timing chart illustrating a focusing operation to be performed in the AF mode.

As illustrated in FIG. 11, a vertical synchronous signal VD is generated by the timing generator 126, and each operation that will be described later is performed in synchronization with the vertical synchronous signal VD. In the AF mode, voltages are applied to the electrodes 212 and 224 of the split image sheet 110 and the electrodes 312 and 324 of the split image sheet 112. A split image in both of vertical and horizontal directions is obtained by performing this operation so that precision in detecting the focal plane is enhanced.

First, in a first frame, a voltage is applied to each of the electrodes 212 and 224 that are disposed at one end of the split image sheet 110. In this case, the electrodes 214 and 222 that are disposed at the other end of the split image sheet 10 are set to ground. When the voltage is applied to each of the electrodes 212 and 224 of the split image sheet 110, if the subject image is not focused on the photographed image, the split image separated in the vertical direction is in step S201 exposed to the CCD 104. This vertically split image is labeled ImgA in FIG. 10.

The exposed image of the subject ImgA is read in the frame that immediately follows its exposure. This step is also shown as step S202 in FIG. 11. The image-plane-deviation position detector (disposed at the MPU 170, in an embodiment) detects an image-plane-deviation position of the image of the subject on the photographed plane of the CCD 104 that is caused by refraction in the split image sheets 110 and 112 based on the image signal generated due to the electrical signal output by the CCD 104. The driving position calculator disposed at the MPU 170, in an embodiment, calculates a driving position of the focusing lens based on an image-plane-deviation position that is detected by the image-plane-deviation position detector. In such embodiments, the driving position calculator measures an amount of image-plane-deviation of the split image (for example, pixel number) by using the read data from the image of the subject and a correlation calculation that determines the position of the focusing lens in which the subject is focused on the photographed plane (S203).

In addition, in the next frame in which ImgB is exposed, a voltage is applied to each of the electrodes 312 and 324 of the split image sheet 112. In this case, the electrodes 314 and 322 are set to ground. When a voltage is applied to each of the electrodes 312 and 324, if the subject image is not focused on the CCD 104, the split image separated in the horizontal direction is exposed on the photographed plane in step S204. This horizontally split image is labeled ImgB in FIG. 11.

The exposed image of the subject ImgB is read in the immediately following frame, as shown also by step S205 in FIG. 10. In addition, an amount of image plane deviation of the horizontally split image (for example, pixel number) is measured by using the data read from ImgB to perform a correlation calculation, whereby the position of the focusing lens in which the subject is focused on the CCD 104 is calculated. This measurement step is shown as step S206 in FIG. 10.

Next, in operation S207, the position of the focusing lens in which the subject is focused on the photographed plane is determined based on the distance measurement operation that is performed in operations S203 and S206. In operation S208, the focusing lens is moved to the position of the focusing lens that is calculated by driving the focusing lens. The focusing lens is driven in non-synchronization with the vertical synchronous signal VD, as illustrated in FIG. 11.

After the focusing lens is moved, the split image sheet 110 or 112 is operated so as to check in-focus (S209). In the embodiment of FIG. 11, a voltage is applied to each of the electrodes 212 and 224 of the split image sheet 110 with timing of the vertical synchronous signal VD after driving of the focusing lens is completed, and the split image is exposed on the photographed plane (ImgC). The exposed subject image ImgC is read in the frame immediately following exposure of the image of the subject, as illustrated in FIG. 11 (S210). It is determined in operation S207 which one of the split image sheets 110 and 112 is operated.

In addition, an amount of image plane deviation of the split image (for example, pixel number) is measured by using the read data from the image of the subject based on correlation calculation, and it is determined whether the subject is focused on the photographed plane or not. Simultaneously, it is determined whether a previously-set, upper-limit loop number of a focusing operation is satisfied or not (S211). When in-focus conditions are satisfied or the loop number exceeds the upper limit, the focusing operation in the AF mode is completed.

After the focusing operation is completed, a photographing operation is performed in the state where a voltage is not applied to each of the split image sheets 110 and 112, thereby recording image data.

Figure 12:
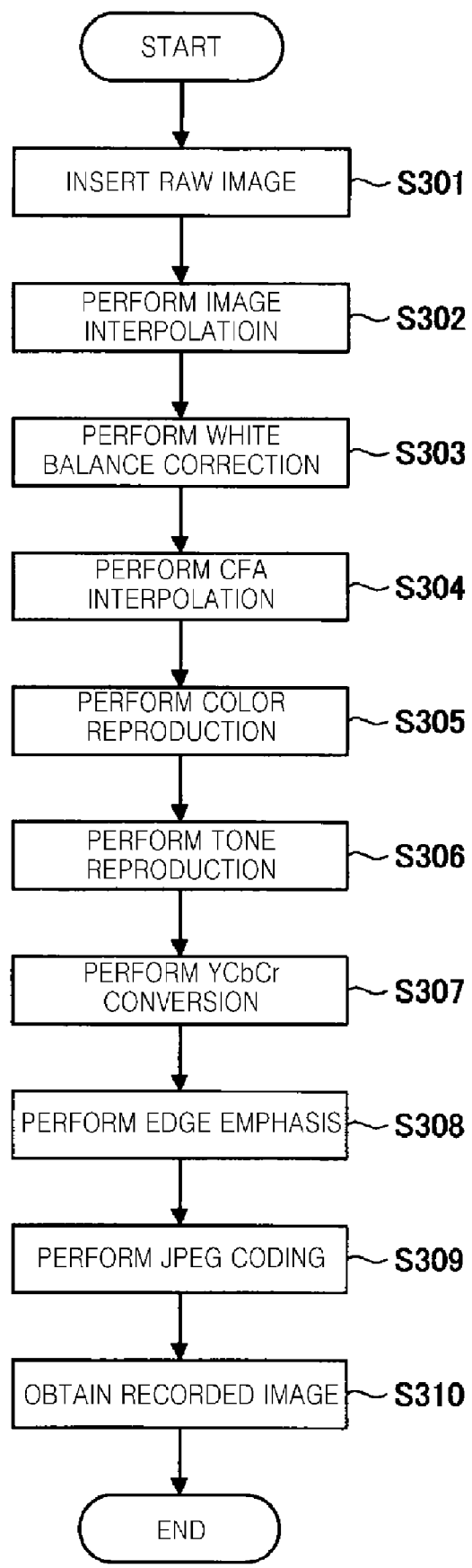
FIG. 12 is a flowchart illustrating an operation of generating an image to be recorded, by using the photographing apparatus of FIG. 1, according to an embodiment of the present invention.

The present invention also includes an alternative method for generating an image to be recorded. Next will be described an alternative operation of generating an image to be recorded by using the photographing apparatus 100, according to an embodiment of the present invention. FIG. 12 is a flowchart illustrating an operation of generating an image to be recorded, by using the photographing apparatus of FIG. 1, according to the current embodiment of the present invention.

First, in operation S301, an analog electrical signal of an image formed on the CCD 104 is converted into a digital image signal, and the digital image signal is inserted in the image processor 152. Next, in operation S302, the image processor 152 performs image interpolation, such as correction of a portion corresponding to a boundary of the electro-optical members 202, 204, 302, and 304, for example. In operation S303, the image processor 152 performs white balance correction (S303), color filter array (CFA) interpolation (S304), color reproduction (S305), and tone reproduction (S306) based on the image signal.

After the above series of image processing is performed, the image signal is YCbCr converted, a brightness signal and a color difference signal are generated (S307), and edge emphasis is performed (S308). The compression processor 150 performs JPEG coding and generates compression data in a JPEG format (S309). The generated image data is recorded in the memory card 131, for example, and the operation of obtaining the photographed image is completed (S310).

Figure 13:
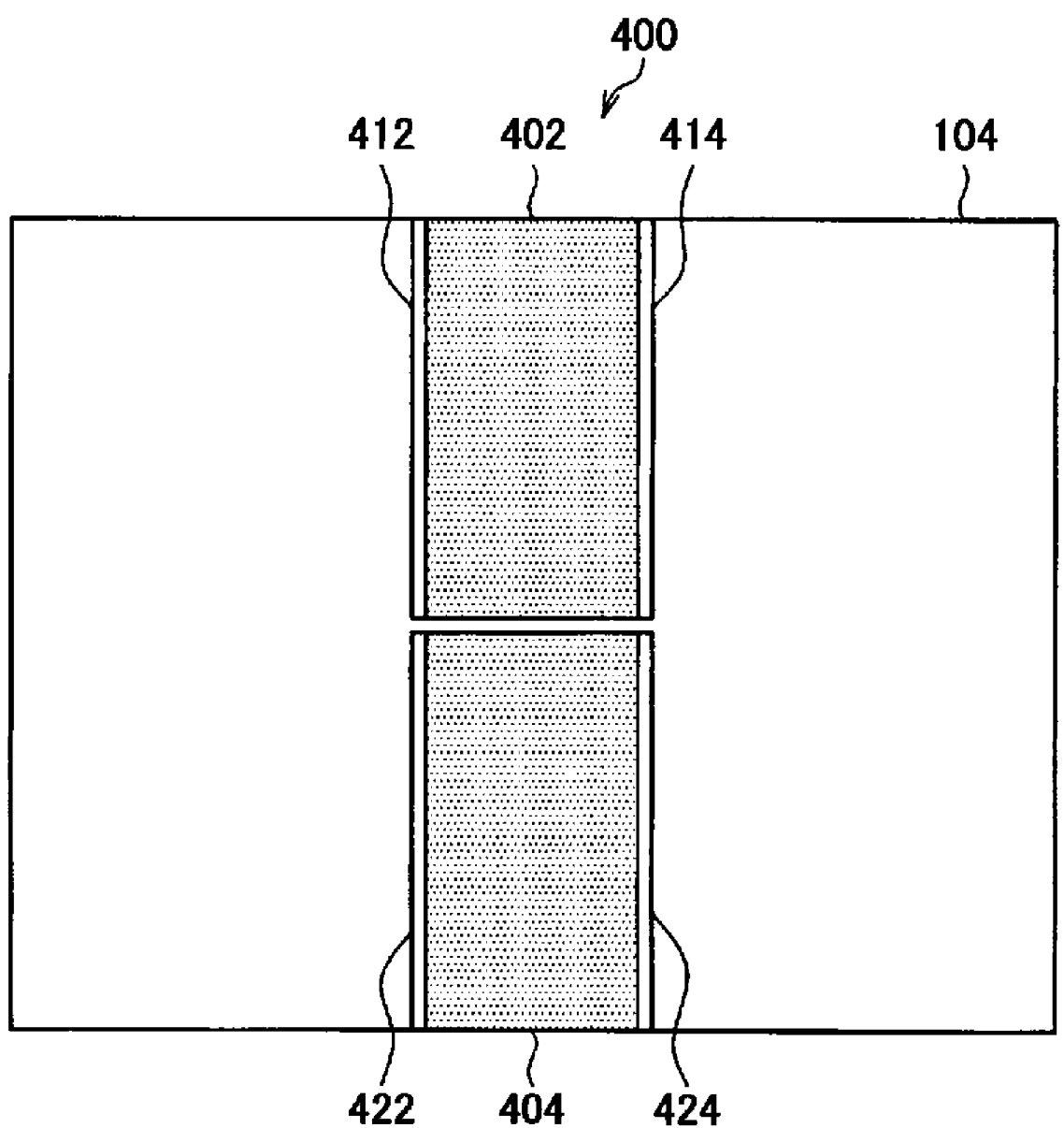
FIG. 13 is a front view illustrating a split image sheet of the photographing apparatus of FIG. 1, according to an embodiment of the present invention.

In the above embodiments, the split image sheets 110 and 112 have nearly the same width as the CCD 104. However, the present invention is not limited thereto. For example, a split image sheet 400 may have a width that covers a smaller portion of the CCD 104, as illustrated in FIG. 13. FIG. 13 is a front view illustrating modification of a split image sheet according to an embodiment of the present invention. The split image sheet 400 includes electro-optical members 402 and 404 and a plurality of electrodes 412, 414, 422, and 424.

In addition, the two electro-optical members 202, 204, 302, 304, and 402, 404 of each of the split image sheets 110,112, and 400 are disposed in such a way that their both ends contact in nearly the middle of the CCD 104 and a boundary thereof occurs. However, the present invention is not limited thereto. For example, the two electro-optical members 202, 204, 302, 304, and 402, 404 may be disposed so that a split image can be formed in a certain position excluding the middle of the photographed plane. In addition, a plurality of electro-optical members may be installed so that split images can be formed in a plurality of positions as well as in one position.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A split image focusing apparatus, comprising at least one electro-optical element disposed along an optical axis between a subject and a photographed plane, wherein the at least one electro-optical element is characterized by a refractive index that varies continuously with distance along a perpendicular to the optical axis when a voltage is applied, and through which an image of the subject is transmitted toward the photographed plane.

2. The split image focusing apparatus of claim 1, wherein the at least one electro-optical elements comprises two electro-optical elements disposed in a position perpendicular both to each other and to the optical axis.

3. The split image focusing apparatus of claim 1, further comprising:
a voltage value controller that changes the voltage applied to the at least one electro-optical element in response to a change in an aperture ratio.

4. The split image focusing apparatus of claim 1, further comprising:
a photographing device disposed on the photographed plane on which light emitted from the subject is formed and converted into an electrical signal;
an image-plane deviation position detector that receives the electrical signal and calculates a deviation in the position of a focusing lens and generates an image-plane-deviation signal;
a focusing lens driving controller that drives a motor attached to the focusing lens along the optical axis; and
a driving position calculator that receives the image-plane-deviation signal and supplies a motor-driving signal to the motor.

5. The apparatus of claim 1, further comprising a voltage polarity controller that changes a polarity of the voltage applied to the at least one electro-optical element based on a relationship between how a focusing lens moves along the optical axis and a direction of a manual operation of moving the focusing lens.

6. The split image focusing apparatus of claim 1, further comprising:
a photographing device disposed on the photographed plane on which light emitted from the subject is formed and converted into an electrical signal;
an image processor that synthesizes a first image that is generated due to the subject image on the photographed plane when a voltage is not applied to the image processor and a second image that is generated due to the subject image on the photographed image when a voltage is applied to the image processor; and
an image display controller that displays the image that is synthesized by the image processor on an image display unit.

7. The split image focusing apparatus of claim 6, wherein the image processor synthesizes the first image and the second image by moving a predetermined amount of a relative position of a plurality of regions in the second image.

8. The split image focusing apparatus of claim 6, further comprising:
an aperture ratio obtaining unit that obtains an aperture ratio of a lens that images the image of the subject on the photographed plane; and
a voltage value controller that adjusts the voltage applied to the at least one electro-optical element based on the obtained aperture ratio.

9. The split image focusing apparatus of claim 6, wherein a predetermined correction operation is performed on the image formed on the photographed plane from light transmitted through the at least one electro-optical element.

10. The split image focusing apparatus of claim 1, further comprising:
a means for changing the voltage applied to the at least one electro-optical element in response to a change in an aperture ratio.

11. The split image focusing apparatus of claim 1, further comprising:
a means for converting light incident to the photographed plane into an electrical signal;
a means for receiving the electrical signal and calculating a deviation in the position of a focusing lens and generates an image-plane-deviation signal;
a means for focusing a lens by receiving the image-plane-deviation signal and supplying a motor-driving signal to the motor.

12. The apparatus of claim 1, further comprising:
a means for changing a polarity of the voltage applied to the at least one electro-optical element based on a relationship between how a focusing lens moves along the optical axis and a direction of a manual operation of moving the focusing lens.

13. The split image focusing apparatus of claim 1, further comprising:
a means for converting light incident to the photographed plane into an electrical signal;
a means for image processing and synthesizing a first image that is generated due to the image of the subject on the photographed plane when a voltage is not applied to the image processor and a second image that is generated due to the image of the subject on the photographed image when a voltage is applied to the image processor; and
a means for displaying an image received from the means for image processing and synthesizing on an image display unit.

14. A method for split image focus photography in a device having at least one electro-optical element disposed along an optical axis between a subject and a photographed plane, wherein the at least one electro-optical element is characterized by a refractive index that continuously varies with distance along a perpendicular to the optical axis when a voltage is applied, and through which an image of the subject is transmitted toward the photographed plane, the method comprising:
converting light transmitted through the electro-optical element and emitted from the subject into an electrical signal by using photoelectrical conversion, wherein the converting is performed by a photographing device disposed on the photographed plane on which the light transmitted through the electro-optical element and emitted from the subject is formed as an image;
detecting an image-plane-deviation position of the image of the subject on the photographed plane that is generated by refraction in the optical element, and based on the electrical signal;
controlling driving of a focusing lens that moves in a direction of an optical axis and focuses the image of the subject on the photographed plane; and
calculating a driving position of the focusing lens based on the detected image-plane-deviation position.

15. The method for split image focus photography of claim 14, further comprising:
   changing the voltage applied to the at least one electro-optical element in response to a change in an aperture ratio.

16. The method for split image focus photography of claim 14, further comprising:
   converting light incident to the photographed plane into an electrical signal;
   receiving the electrical signal and calculating a deviation in the position of a focusing lens and generates an image-plane-deviation signal;
   focusing a lens by receiving the image-plane-deviation signal and supplying a motor-driving signal to the motor.

17. The method for split image focus photography of claim 14, further comprising:
   changing a polarity of the voltage applied to the at least one electro-optical element based on a relationship between how a focusing lens moves along the optical axis and a direction of a manual operation of moving the focusing lens.

18. The method for split image focus photography of claim 14, further comprising:
   converting light incident to the photographed plane into an electrical signal;
   processing and synthesizing a first image that is generated due to the image of the subject on the photographed plane when a voltage is not applied to the image processor and a second image that is generated due to the image of the subject on the photographed image when a voltage is applied to the image processor; and
   displaying an image received from the means for image processing and synthesizing on an image display unit.

* * * * *